United States Patent [19]
Crawford, Jr. et al.

[11] Patent Number: 5,943,244
[45] Date of Patent: Aug. 24, 1999

[54] SYSTEM FOR OPTIMIZING A NETWORK PLAN AND METHOD OF OPERATION

[75] Inventors: James M. Crawford, Jr., Flower Mound; Brian M. Kennedy, Coppell; John C. Hogge, Dallas, all of Tex.

[73] Assignee: i2 Technologies, Inc., Irving, Tex.

[21] Appl. No.: 08/800,717

[22] Filed: Feb. 17, 1997

[51] Int. Cl.[6] .................................................. G06F 17/10
[52] U.S. Cl. .......................... 364/512; 364/148; 364/578
[58] Field of Search .................................... 364/512, 578, 364/148; 395/500

[56] References Cited

U.S. PATENT DOCUMENTS

| | | | |
|---|---|---|---|
| 4,525,775 | 6/1985 | Eydelman | 364/148 |
| 4,924,386 | 5/1990 | Freedman | 364/492 |
| 5,159,562 | 10/1992 | Putman et al. | 364/494 |
| 5,337,320 | 8/1994 | Kung | 371/15.1 |
| 5,440,671 | 8/1995 | Shiratani | 395/25 |
| 5,521,814 | 5/1996 | Teran et al. | 364/402 |
| 5,602,964 | 2/1997 | Barrett | 395/24 |
| 5,689,591 | 11/1997 | Balram et al. | 382/276 |
| 5,748,847 | 5/1998 | Lo | 395/23 |
| 5,764,513 | 6/1998 | Toyota | 364/468.01 |
| 5,781,430 | 7/1998 | Tsai | 364/148 |
| 5,781,764 | 7/1998 | Degeneff | 395/500 |
| 5,787,234 | 7/1998 | Molloy | 395/51 |
| 5,794,224 | 8/1998 | Yufik | 706/14 |
| 5,871,432 | 7/1998 | Keeler | 364/164 |

FOREIGN PATENT DOCUMENTS

| | | | |
|---|---|---|---|
| 1487193 | 8/1974 | United Kingdom | 7/122 |

OTHER PUBLICATIONS

J. Dorn, "Iterative Improvement Methods for Knowledge Based Scheduling", Al Communications, vol. 8, No. 1, Mar. 1985, pp. 20–34. (Abstract Only).

H. Tomeoka et al., "New Daily Hydro Scheduling System for Multi–Chain Hydro Power System", International Journal of Engineering and Communications, vol. 2, No. 1, Mar. 1994, pp. 23–30. (Abstract Only).

*Primary Examiner*—Kevin J. Teska
*Assistant Examiner*—A. S. Roberts
*Attorney, Agent, or Firm*—Baker & Botts, L.L.P.

[57] ABSTRACT

A system is provided for optimizing a network plan. The system includes a memory which stores information specifying a network plan, a plurality of constraints, and a plurality of interaction coefficients. Each interaction coefficient corresponds to particular constraint. A processor is coupled to the memory. The processor is operable to determine whether the network plan violates any of the constraints, modify the network plan in order to resolve a violation of any constraint, and update a corresponding interaction coefficient in order to reflect an impact upon the network plan caused by the resolution of a violation.

20 Claims, 2 Drawing Sheets

SYSTEM FOR OPTIMIZING A NETWORK PLAN AND METHOD OF OPERATION

TECHNICAL FIELD OF THE INVENTION

This invention relates in general to the field of electronic systems, and more particularly to a system for optimizing a network plan and method of operation.

BACKGROUND OF THE INVENTION

Planning is essential to almost any endeavor. In a network comprising a number of elements, proper planning can optimize the operation of the elements, both on an individual basis and a collective (i.e, network) basis.

In the past, the process for deriving a suitable network plan could be painstakingly difficult. In most cases, certain restrictions, limitations, or other constraints on the operation or function of a network had to be taken into account. When a version of a network plan violated one or more of such constraints, that version was generally modified or changed in order to eliminate or resolve the violations. However, if the elements within a network interacted, any resolution taken to remedy the violation of one constraint could cause another constraint to be violated. Because it was difficult to determine how a specific change would impact or effect a version of a network plan, a network plan often had to be modified a great number of times before a suitable version was derived.

Furthermore, when a network is operated, "bottlenecks" may arise such that optimized operation is not realized. More specifically, a bottleneck can be any part of a network that hinders or impedes other parts of the network. Although it is desirable to identify these bottlenecks, previous systems and techniques were not able to do so in a satisfactory manner.

SUMMARY OF THE INVENTION

In accordance with the present invention, a system for optimizing a network plan and method of operation are provided that substantially reduce or eliminate problems and disadvantages associated with prior techniques.

According to one embodiment of the present invention, a system is provided for optimizing a network plan. The system includes a memory which stores information specifying a network plan, a plurality of constraints, and a plurality of interaction coefficients. Each interaction coefficient corresponds to particular constraint. A processor is coupled to the memory. The processor is operable to determine whether the network plan violates any of the constraints, modify the network plan in order to resolve a violation of any constraint, and update a corresponding interaction coefficient in order to reflect an impact upon the network plan caused by the resolution of a violation.

According to another embodiment of the present invention, a system is provided for optimizing a network plan. The system includes a memory operable to store information specifying a network plan, a plurality of constraints, and a plurality of interaction coefficients, each interaction coefficient corresponding to particular constraint. A constraint checker module is operable to access the memory. The constraint checker module determines whether the network plan violates any of the constraints. A resolver module is operable to communicate with the constraint checker module. The resolver module can modify the network plan in order to resolve a violation of any constraint. The resolver module is also operable to update a corresponding interaction coefficient in order to reflect an impact upon the network plan caused by the resolution of a violation.

According to yet another embodiment of the present invention, a method is provided for optimizing a network plan. The method includes the following steps: receiving information specifying a network plan, a plurality of constraints, and a plurality of interaction coefficients, each interaction coefficient corresponding to particular constraint; determining whether the network plan violates any of the constraints; modifying the network plan in order to resolve a violation of any constraint; and updating a corresponding interaction coefficient in order to reflect an impact upon the network plan caused by the resolution of a violation.

A technical advantage of the present invention includes providing one or more interaction coefficients. These interaction coefficients are each associated with a particular constraint upon the operation or function of a network. Each interaction coefficient can be modified to provide a measure of past experience when resolving a violation of the corresponding constraint in a network plan. In other words, these interaction coefficients reflect the learned behavior between resolutions of various constraint violations. The interaction coefficients are used to normalize the consideration given to various violations of constraints in a network plan. In this manner, the violations of various constraints can be afforded appropriate consideration when modifying the network plan so that progress is made toward an optimal plan. Furthermore, as the interaction coefficients are modified to reflect learned behavior, coefficients associated with bottlenecks in the network will increase. A bottleneck in the operation of a network may be identified by a particularly large interaction coefficient. Other important technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
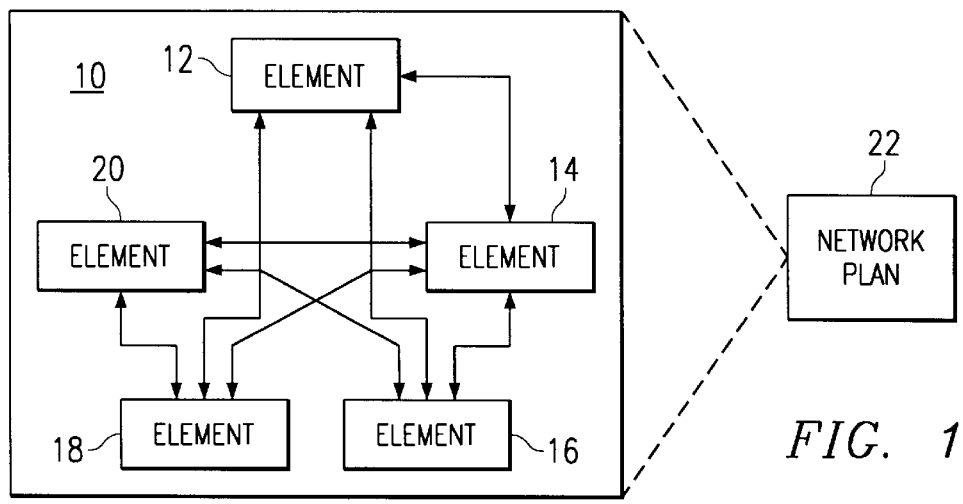
FIG. 1 illustrates a block diagram of a network and a plan for its operation.

The preferred embodiment of the present invention and its advantages are best understood by referring to FIGS. 1–4 of the drawings, like numerals used for like and corresponding parts of the various drawings.

Turning first to the nomenclature of the specification, the detailed description which follows is represented largely in terms of processes and symbolic representations of operations performed by conventional computer components, such as a central processing unit ("CPU") or processor associated with a general purpose computer system, memory storage devices for the processor, and connected pixeloriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with a human operator or user that interacts with the computer or computers.

In addition, it should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic programs stored in non-volatile memory, such as read-only memory (ROM).

Referring now to the drawings, FIG. 1 illustrates a network 10 and a plan 22 for the its operation. Network 10 comprises a plurality of elements 12–20, which can be operated individually and in combination. For example, network 10 can be a power-generating facility, in which case elements 12–20 may comprise various machine resources, such as power generators, housings, power lines, mechanical controls, etc., and human resources, such as operators for the facility. Another exemplary network 10 may be a supply chain for delivering products to a number of consumers. In this case, elements 12–20 can be one or more factories for manufacturing the products, any manufacturing equipment within such factories, warehouse facilities for storing finished products, distribution facilities, and human resources working in any of the above.

Elements 12–20 interact during the operation of network 10. Interaction is generally defined as any type of action which may be taken within, on, or with respect to one element 12–20 that creates some type of reaction in at least one other element 12–20. An example of interaction can be the creation of additional electromagnetic energy in one or more power lines when the speed of a power generator is increased in a power-generating facility. In FIG. 1, interaction is represented by arrows between interacting elements 12–20 of network 10. As shown, element 12 interacts with elements 14, 16, and 18. Likewise, element 14 interacts with elements 12, 16, 18, and 20. Element 16 interacts with elements 12, 14, and 20. Element 18 also interacts with elements 12, 14, and 20. Element 20 interacts with elements 14, 16, and 18. It can be seen, however, that not all elements 12–20 necessarily interact with all other elements 12–20. For example, element 18 does not interact with element 16, and element 20 does not interact with element 12.

Network plan 22 provides a strategy or plan for operating network 10. Typically, it is desirable to configure network plan 22 so that certain goals for the operation of network 10 are met. For example, one goal in a product delivery supply chain may be minimizing the inventory stored in various warehouses, while maintaining sufficient inventory to meet unexpected demand. Thus, a network plan 22 for such supply chain should specify an optimal number of products to be warehoused. In addition, network plan 22 must take into account various constraints to which the operation or function of network 10 may be subject. In a supply chain, constraints include such things as limitations of capacity, material availability, equipment operation, and due date of shipments. For example, a constraint may require that products be shipped within seven working days after an order for such products is received. As another example, a constraint may provide that a particular piece of equipment, such as a boiler, cannot be operated at a temperature higher than 500° C. As yet another example, a constraint may provide that operators of heavy machinery are only allowed to work 40 hours per work week. According to the present invention, the constraints imposed upon network 10 may be separated into various groupings as discussed below in more detail with reference to FIG. 2.

Ideally, network plan 22 would be configured to meet all of the goals for the operation of network 10 while not violating any of the constraints imposed upon such operation. In many cases, however, because various constraints and goals may be at odds with one another, such an ideal network plan cannot be achieved. For these cases, it is desirable to maximize the number of goals met by network plan 22 while minimizing the number of constraints violated. The process of deriving such a network plan is hereinafter referred to as "optimization." At the initiation of an optimization process, network plan 22 may comprise a plan for network 10 that can be improved to reduce the number of constraints violated and/or increase the number of goals met. In one embodiment, the progress toward an optimal network plan 22 can be tracked by goal values, each goal value being a numerical representation of how well a particular version of network plan 22 achieves the desired goals.

For network 10 comprising the plurality of interacting elements 12–20, the process of optimization is complicated by the interaction between these various elements. More specifically, if network plan 22 is modified to eliminate the violation of some constraint in one element 12–20, this modification may cause some other constraint to be violated in another element 12–20. For example, one version of a network plan may specify that a turbine should operate at a particularly high speed in order to deliver the proper amount of power to users. The specified speed, however, may be in violation of a constraint regarding how fast the turbine can be operated. If such version of the network plan is modified so that the operating speed does not violate the constraint on speed, then a constraint regarding the amount of power that needs to be delivered by the facility may be violated because the reduced speed leads to reduced power output.

According to the present invention, when the resolution of a violation of one constraint causes the violation of another constraint, the two violations are normalized utilizing interaction coefficients. These interaction coefficients partially define goals for a network plan 22 and reflect the learned behavior between resolutions of various constraint violations. Through the use of interaction coefficients, the violations of various constraints can be afforded appropriate consideration when modifying network plan 22 so that progress is made toward an optimal network plan 22. During the optimization process, the interaction coefficients can be modified so that the goals are refined and, accordingly, changes to a network plan will increase the goal value. All of this is described below in more detail.

Figure 2:
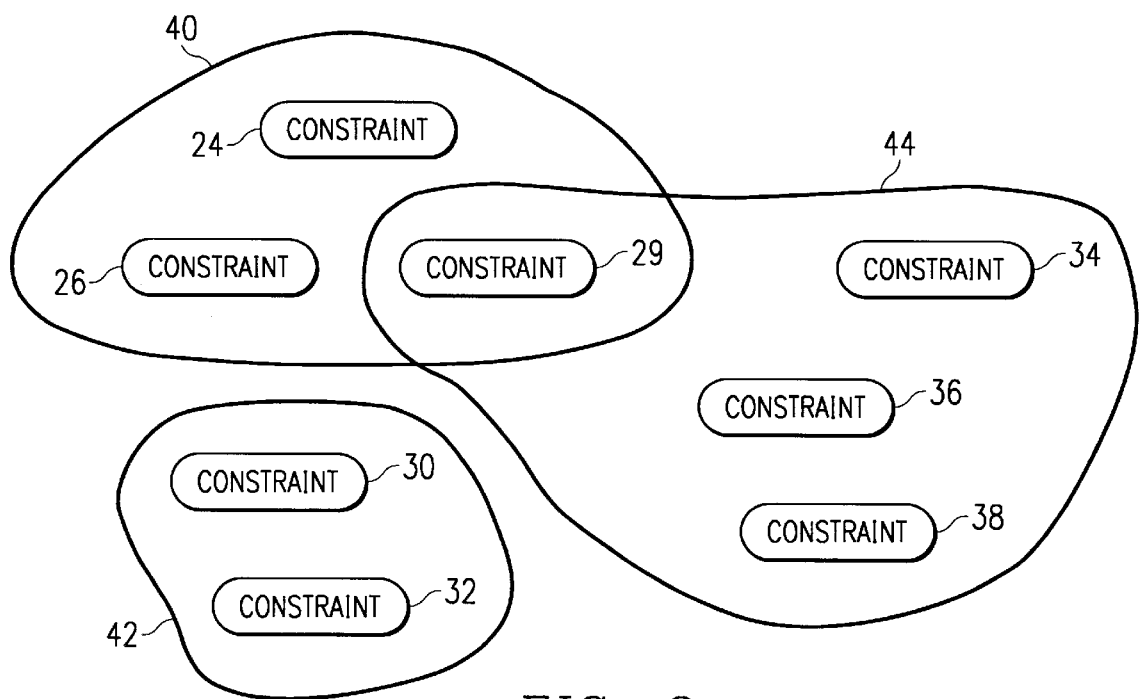
FIG. 2 illustrates a number of groupings of constraints that may be imposed upon the operation of the network shown in FIG. 1.

FIG. 2 illustrates a plurality of constraints 24–38 which may apply to the operation or function of network 10 shown in FIG. 1. Each constraint 24–38 may be any constraint which is imposed upon or mandated by the operation or function of network 10. According to the present invention, each of constraints 24–38 may be grouped or associated with other constraints 24–38 in one or more groupings 40–42. A single constraint can belong to more than one grouping. As shown, grouping 40 comprises constraints 24, 26, and 28; grouping 42 comprises constraints 30 and 32; and grouping 44 comprises constraints 28, 34, 36, and 38.

Essentially, each grouping 40–44 is defined to be any number of constraints 24–38 wherein experiences with one constraint within the grouping typically may be translated to other constraints within the same grouping. Accordingly, any behavior that is learned about one constraint in a particular grouping can be applied to the corresponding interaction coefficients for all constraints within the grouping.

In one embodiment, all constraints relating to a particular element 12–20 within network 10 may be put into the same grouping. For example, if an element comprises a boiler, a single grouping may comprise the following constraints: the boiler cannot be operated at a temperature higher than 500° C., the boiler must be shut down for maintenance every twenty days, the boiler can only be used with water, etc. As another example, if an element comprises human operators at a power generation facility, a grouping may comprise the following constraints: operators are paid at regular wages for the first forty hours of each week and at overtime wages thereafter, under no circumstances should an operator work more than a total of sixty hours in a given seven day period, operators must be supplied with proper safety equipment, etc.

In another embodiment, a grouping may comprise all constraints relating to a particular kind of problem (e.g., shortage, lateness, overload, etc.). For example, a grouping in a supply chain may include the following constraints: raw materials are considered to be late if not received within twenty days after they were ordered, a final product is considered to be late if not shipped within five days after ordering, etc.

Other groupings can be defined in addition to, or as alternatives for, the constraints 26–38 imposed upon network 10, each grouping defined as any number of constraints wherein experiences with one constraint may be translated to other constraints.

As a corollary, multiple coefficients can be provided for each constraint. These coefficients may relate to various factors, such as time, size, or the like. For example, one coefficient may be provided for violations of a constraint during a first week, and another coefficient may be provided for violations of the same constraint during a second week. Likewise, one coefficient may be provided for violations of a constraint having a relatively small size, while another coefficient may be provided for violations having a relatively large size. The present invention contemplates that the coefficients for a single constraint can be partitioned according to size, time, etc.

Figure 3:
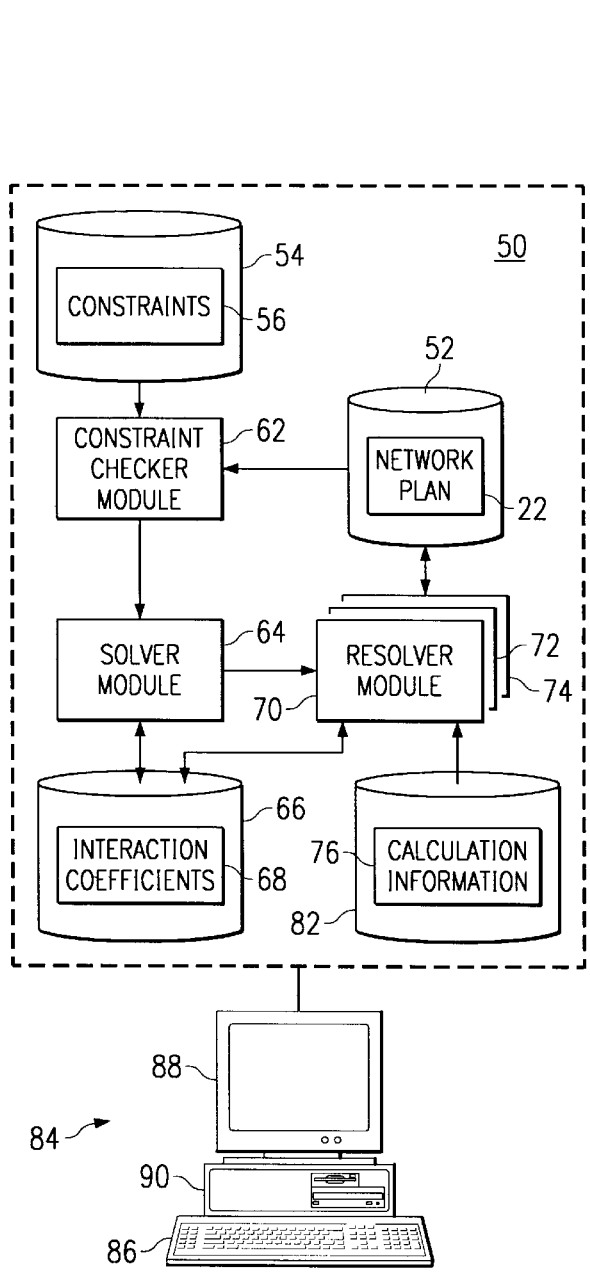
FIG. 3 illustrates a block diagram of an exemplary system for optimizing a network plan, according to an embodiment of the present invention.

FIG. 3 illustrates a block diagram of a system 50 for optimizing a network plan 22, according to an embodiment of the present invention. Generally, optimization system 50 can be used to modify an initial network plan 22 over one or more iterations in order to generate an optimal network plan 22 with a minimum number of constraints violated and a maximum number of goals met. Optimization system 50 can be incorporated in a strategy driven planning system such as that described in U.S. patent application Ser. No. 08/491,168, entitled "Strategy Driven Planning System and Method of Operation," the entire disclosure of which is incorporated herein by reference.

Optimization system 50 includes a network plan memory 52. Network plan memory 52 may reside in a suitable storage medium, such as random access memory (RAM), read only memory (ROM), disk, tape storage, or other suitable volatile and/or non-volatile data storage system. Network plan memory 52 can be a relational database. Network plan memory 52 receives, stores, and forwards information for network plan 22, such as provided for network 10 shown in FIG. 1. As described above, network plan 22 may provide a plan or strategy for operation for network 10, including overall operation and the operation of each element 12–20 within the network 10.

A constraint memory 54 is also included in optimization system 50. Constraint memory 54 may reside in a suitable storage medium, such as RAM, ROM, disk, tape storage, or other suitable volatile and/or non-volatile data storage system. Such data storage system can be the same or separate from the data storage system containing network plan memory 52. Constraint memory 54 can be a relational database. Constraint memory 54 functions to receive, store, and forward constraint information 56. Generally, constraint information 56 comprises any information relating to one or more constraints that are imposed upon the operation or function of network 10 for which network plan 22 is provided. For each constraint, constraint information 56 may include a "size" for a violation of the constraint. The size of a violation may be a numerical value specified by a user and provides a measure of the impact of the violation in isolation from network 10. Within constraint information 56, the constraints may be grouped into various groupings, such as groupings 40–44 shown in FIG. 2. Each grouping is defined to be any number of constraints wherein experiences with one constraint within the grouping can be translated to other constraints within the same grouping.

A constraint checker module 62 is operable to access network plan memory 52 and constraint memory 54. The functionality of constraint checker module 62 as described herein may be performed by a processor, such as a mainframe, file server, workstation, or other suitable data processing facility running appropriate software. Constraint checker module 62 receives network plan 22 and constraint information 56 from network plan memory 52 and constraint memory 54, respectively. Generally, constraint checker module 62 is operable to determine whether any aspect of network plan 22 violates a constraint specified by constraint information 56. If constraint checker module 62 detects any violation of a constraint within network plan 22, constraint checker module 62 is operable to generate an alert signal. Constraint checker module 62 may also function to assign the user-specified numerical value to each constraint violation, such numerical value representing the "size" of the violation. As described below in more detail, the size of a violation can be used in calculating how the violation impacts the network plan 22.

A solver module 64 is operable to communicate with constraint checker module 62. The functionality of solver module 64 can be performed by a processor, such as a mainframe, file server, workstation, or other suitable data processing facility running appropriate software. This processor may be the same or separate from that processor which performs the functionality for constraint checker module 62. Solver module 64 may receive alert signals from constraint checker module 62. In response to receiving an alert signal, solver module 64 functions primarily to invoke or select one or more of a plurality of resolver modules 70–74 to resolve the violations of constraints identified by constraint checker module 62. In selecting a particular resolver module 70–74, solver module 64 may utilize interaction coefficient (IC) information 68. In one embodiment, solver module 64 may perform a local search algorithm designed to optimize the goal value for network plan 22.

Interaction coefficient information 68 specifies one or more interaction coefficients. Generally, interaction coefficients characterize, delineate, or otherwise define the interaction between various elements 12–20 in network 10. Interaction coefficients, each of which can be assigned a numerical value, are used to normalize the treatment or consideration given to various violations of constraints in a network plan 22. A relatively high numerical value for an interaction coefficient indicates that previous attempts to resolve a violation of the corresponding constraint have not been relatively successful. On the other hand, a relatively low numerical value for an interaction coefficient indicates that previous attempts to resolve a constraint violation have been relatively successful. The impact of a constraint violation upon network plan 22 may be numerically represented, such representation being derived or calculated from the violation's size and the interaction coefficient corresponding to the violated constraint. In particular, the interaction of a constraint violation is defined as the product of the violation's size and the interaction coefficient corresponding to constraint. If a constraint is contained within multiple constraint groupings (e.g., constraint 28 shown in FIG. 2), the interaction of a constraint violation is defined as the product of the violation's size and the sum of the interaction coefficient for each grouping.

The present invention contemplates that these interaction coefficients can be "learned" as optimization system 10 performs the process of optimization to derive an optimal network plan 22 for network 10. More specifically, interaction coefficients are associated with or "live on" each constraint or group of constraints and measure the past experience with resolving violations of that constraint. If past resolutions of violations for a particular constraint have caused other constraints to be violated and/or radically changed the goal function of network plan 22, this should be reflected in the interaction coefficient for such constraint. Accordingly, during the operation of optimization system 10, interaction coefficients are modified or updated.

An interaction coefficient memory 66 is accessible by solver module 64. Interaction coefficient memory 66 may reside in a suitable storage medium, such as RAM, ROM, disk, tape storage, or other suitable volatile or non-volatile data storage system, which can be the same or separate from the data storage system(s) supporting the other memories described herein. This memory can be a relational database. Interaction coefficient memory 66 may receive, store, and forward interaction coefficient information 68 utilized by solver module 64.

Each of resolver modules 70–74 is operable to communicate with solver module 64 and access interaction coefficient memory 66. The functionality of resolver modules 70–74 can be performed by any suitable processor, such as a mainframe, file server, or workstation, running appropriate software. Such processor can be the same or separate from the processor or processors performing the functionality of constraint checker module 62 and solver module 64. Resolver module 70–74 can be invoked by solver module 64. Each resolver modules 70–74 functions to resolve the violation of a particular constraint within network plan 22, such violation having been detected by constraint checker module 62. For example, in a supply chain environment, if it is determined that a factory has violated a constraint by not outputting enough units of a finished product, a resolver module 70–74 may function to increase raw materials being received at such factory.

Each resolver module 70–74 also functions to update or modify an interaction coefficient associated with the constraint for which that resolver module is provided to address. In particular, because of the interaction of elements 12–20 in network 10, each action specified or recommended by a resolver module 70–74 does not work in isolation. Rather, each action starts a "ripple" which causes other things to happen in network 10. These other things may have both beneficial impact and also detrimental impact on network 10. Such detrimental impact includes causing the violation of another constraint imposed upon network 10. By modifying or updating interaction coefficients specified in interaction coefficient information 68, the present invention normalizes the amount of consideration that is afforded to resolving between violations of one constraint and violations of some other constraint.

To update or modify interaction coefficients, each resolver module 70–74 may utilize calculation information 76 which generally comprises any information which can be used to update the interaction coefficients. This calculation information 76 may specify a goal function, goal weights, and sets of constraints defined in terms of goal function. A goal function can be a mathematical equation representing a goal for which it is desirable to maximize (e.g., maximize power output by a particular turbine in a power-generating facility). A goal function may be defined as a sum of terms, such terms being derived from various interactions of constraint violations, goal weights, the sets of constraints, and a "catchall" value. As described above, an interaction of a constraint violation is defined as the product of the size of the violation and the appropriate interaction coefficient. In one embodiment, if a constraint is satisfied, its size will have a value of zero ("0"); otherwise, the size of the constraint will have a value specified by a user. Goal weights represent the importance or "weight" given to a particular goal. If a constraint within the set of constraints is related to the goal function, it will have a value of one ("1"); otherwise, the constraint will have a value of zero ("0"). The "catchall" value provides a numerical value for the part of a goal function that does not relate to interaction.

A goal function is given by the following equation:

$$\text{goals} = \sum_{i=0}^{n} GW_i * \sum_{c=0}^{m} C_i(c) S(c) IC(c) + G \qquad (1)$$

where "$GW_i$" represents the goal weight for a goal "i" in a set of n goals; "$C_i(c)$" represents a constraint "c" in a set of m constraints (i.e., $C_1, C_2, \ldots, C_m$) mentioned in terms of the goal function; "$S(c)$" represents the size of a constraint violation; "$IC(c)$" represents an appropriate interaction coefficient for the constraint violation; and "G" represents the catchall value for the part of the goal function that does not relate to interaction.

With a few assumptions, an equation for updating or modifying interaction coefficients can be derived from equation (1) above. To begin, assume that a goal function should be maximized. Also, assume that solver module 64 elects to resolve a violation of constraint "c". This will reduce or eliminate the violation, and may cause violations on other constraints. The premise for an update equation is as follows: the "new term" for an interaction coefficient should be chosen such that if the interaction coefficient for constraint c was set to be the new term, then undoing the resolution of the constraint violation would not change the value of the goal function. In other words, the fact that the constraint violation may be resolved on constraint c means that these two states are locally equivalent. The new term for constraint c's interaction coefficient is chosen to reflect this equivalence. This new term for constraint c is then averaged into constraint c's old interaction coefficient to give the updated value.

From the premise and equation (1) given above, an equation for updating an interaction coefficient is as follows:

$$\text{new term} = \frac{\sum_{i=0}^{n} GW_i * \sum_{c \neg \in A} C_i(c) \Delta S(c) IC(c) + \Delta G}{\sum_{i=0}^{n} GW_i * \sum_{c \in A} C_i(c) \Delta S(c)} \qquad (2)$$

where "$\Delta X$" represents difference between the value of "X" after the resolution and the value of "X" before the resolution, "X" being either "$S(c)$" or "G;" and "A" represents the set of constraints that share an interaction coefficient with "c". From here, a running average of each of the numerator and the denominator can be maintained, and the interaction coefficient set to be the quotient of these two terms.

As stated above, the constraints imposed upon the operation of network 10 can be separated into various groupings, such as groupings 40–44 shown in FIG. 2. Each grouping is defined to be a number of constraints wherein the experiences with one constraint in the grouping can be translated to other constraints in the grouping. Accordingly, the behavior learned for the violation of one constraint in the grouping may be imparted to violations of other constraints in the grouping. Thus, the interaction coefficients for all constraints within a grouping may be changed or modified at the same time.

Learned interaction coefficients are used to normalize the amount of consideration afforded to a particular constraint violation when resolving between constraints. Thus, when changes are made to a version of network plan 22, the present invention ensures that progress will be made toward an optimal plan. In particular, resolver modules 70–74 can use the learned interaction coefficients to select between resolutions—i.e., a resolver module 70–74 will elect to resolve the violation of a constraint having a lower interaction coefficient. As stated above, a relatively low interaction coefficient indicates that past resolutions of such constraint have been relative successful. Furthermore, as interaction coefficients are learned by optimization system 50, coefficients associated with bottlenecks in network 10 will increase. Accordingly, the present invention provides a way to identify bottlenecks.

Once the interaction coefficients have been updated, the operating resolver module 70–74 stores the updated coefficient into interaction coefficient memory 66. The changes to a network plan 22 are incorporated into the network plan information within network plan memory 52, where it can be accessed by constraint checker module 62 to determine violations of one or more constraints.

A calculation memory 82 is accessible by resolver modules 70–74. Calculation memory 82 may receive, store, and forward calculation information 76, including goal information 78 and weighting information 80, utilized by resolver modules 70–74 to update the interaction coefficients. Calculation memory 82 can reside in a suitable storage medium, such as RAM, ROM, disk, tape storage, or other suitable volatile or non-volatile data storage system, which can be the same or separate from the data storage system(s) supporting network memory 52, constraint memory 54, and interaction coefficient memory 66 described herein. Like the other memories, calculation memory 82 can be a relational database.

Optimization system 50 may operate on one or more computers, shown generally as computer 84. Computer 84 maintains and executes the instructions to perform the determination of constraint violations, selection/invocation of various resolver modules, the resolution of constraint violations, and the updating of interaction coefficients, as described above. Computer 84 includes an input device 86, such as a keypad, touch screen, or other device that can accept information. An output device 88 conveys information associated with the operation of optimization system 50, including digital data, visual information or audio information. The input device 86 and output device 88 may include fixed or removable storage media, such as magnetic computer disk, optical disk, CD/ROM, or other suitable media to both receive output from and provide input to optimization system 50. One or more processors 90 and their associated memories execute instructions and manipulate information in accordance with the operation of the optimization system 50 described herein.

Figure 4:
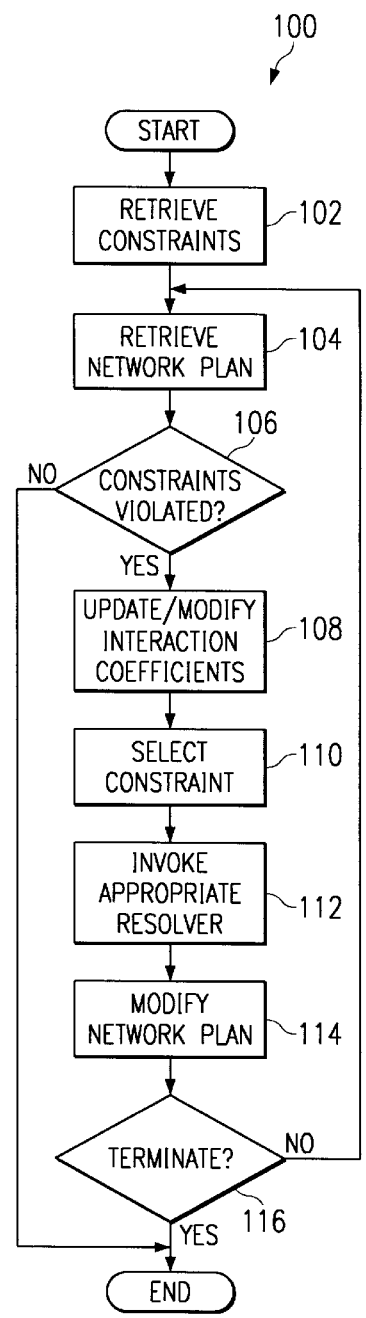
FIG. 4 is a flow chart of an exemplary method for optimizing a network plan, according to an embodiment of the present invention.

FIG. 4 is a flow chart of an exemplary method 100 for optimizing network plan 22, according to an embodiment of the present invention. In one embodiment, method 100 corresponds to the operation of optimization system 50. In such case, during the steps of method 100, a user of optimization system 50 may interact with the system, preferably via a suitable interface.

Method 100 begins at step 102 where constraint checker module 62 retrieves constraint information 56 from constraint memory 54. At step 104, constraint checker module 62 retrieves a current version of network plan 22 from network plan memory 52. At the beginning of method 100, it is contemplated that network plan 22 may comprise a plan for network 10 that can be improved to reduce the number of constraints violated.

At step 106, constraint checker module 62 determines whether any constraints specified in constraint information 56 are violated within network plan 22. If no constraints are violated, method 100 ends; network plan 22 in its current form can be used as a strategy or plan for network 10. On the other hand, if it is determined that one or more constraints are violated within the current version of network plan 22, constraint checker module 62 assigns a user-specified numerical value to the violation and generate an alert.

Solver module 64 receives the alert from constraint checker module 62. Solver module 64 retrieves one or more interaction coefficients from interaction coefficient memory 66, and, at step 108, updates the interaction coefficients for appropriate constraints. Initially, at the first iteration, the interaction coefficient for each constraint can be set to a numerical value of one ("1". In iterations which follow the first iteration, interaction coefficients can be updated using equation (2) set forth above.

At step 110, solver module 64 selects one of the constraints which has been violated (as determined by constraint checker module 62). When selecting a violated constraint in later iterations, solver module 64 may consider the value of the interaction coefficient corresponding to each violated constraint. At step 112, solver module 64 invokes an appropriate resolver module 70–74.

At step 114, the invoked resolver module 70–74 modifies network plan 22 to remedy the violated constraint that was selected. The modified network plan is stored into network plan memory 52.

At step 116, optimization system 50 queries a user whether processing should be terminated. If a user does not wish to terminate processing, then method 100 returns to step 104 where constraint checker module 62 retrieves the modified network plan 22 from network plan memory 52.

Method 100 repeats steps 104–116 until such time as it is determined at step 106 that no constraints have been violated or, alternatively, that a user wishes to terminate processing at step 116.

During each iteration after the first, a resolver module 70–74 may update the interaction coefficients at step 108 using equation (2) set forth above. By modifying or updating the interaction coefficients corresponding to the various constraints, the present invention normalizes the amount of consideration that is afforded to resolving between violations of one constraint and violations of some other constraint. This, is turn, speeds up the process of deriving an optimal network plan 22—i.e., one that optimizes the operation or function of network 10. In particular, resolver modules 70–74 can use the learned interaction coefficients to select between resolutions—i.e., a resolver module 70–74 will elect to resolve the violation of a constraint having a lower interaction coefficient. Furthermore, as the various interaction coefficients are modified to reflect learned behavior, any interaction coefficients associated with constraint violations which cause bottlenecks will increase. Thus, these bottlenecks can be readily identified in network 10.

Although the present invention and its advantages have been described in detail, it should be understood that various changes, substitutions, and alterations can be made therein without departing from the spirit and scope of the invention as defined by the appended claims.

What is claimed is:

1. A computer-implemented system for solving a network planning problem, the system comprising:

a memory operable to store information specifying a network plan, a plurality of constraints, and a plurality of interaction coefficients, each interaction coefficient corresponding to particular constraint, and at least one goal; and a processor coupled to the memory, the processor operable to model said network, said constraints, and said at least one goal as a constraint satisfaction problem, to initialize said interaction coefficients for each solution to said problem, and to provide said solution by iteratively repeating the following steps: to determine whether a proposed network plan violates any of the constraints, if so, to update an interaction coefficient corresponding to each violated constraint, said coefficient reflecting an impact upon said at least one goal caused by the resolution of a violation, to select a constraint violation to be resolved on the basis of said interaction coefficient, and to generate a new plan in accordance with resolution of a selected constraint violation;

said processor further operable to provide data representing a display pertaining to said solution.

2. The system of claim 1, wherein the constraints are separated into at least one grouping, the processor further operable to update the corresponding interaction coefficients for each constraint within the grouping in order to reflect an impact upon the network plan caused by the resolution of a violation of one constraint in the grouping.

3. The system of claim 2, wherein the network plan is provided for a network comprising a plurality of interacting elements, and wherein the constraints are grouped according to association with a particular element of the network.

4. The system of claim 2, wherein the constraints are grouped according to association with a particular type of problem.

5. The system of claim 2, wherein each constraint has a corresponding size, and wherein the constraints are grouped according to size.

6. The system of claim 1, wherein the memory is operable to store information specifying a goal weight, a size for a violation of a constraint, a catchall value.

7. The system of claim 6, wherein the processor is operable to update an interaction coefficient using the goal weight, the size for a violation of a constraint, and the catchall value.

8. The system of claim 1, wherein the processor is further operable to modify the network plan using the updated interaction coefficient.

9. A computer-implemented system for solving a network planning problem, the system comprising:

a memory operable to store information specifying a network plan, a plurality of constraints, and a plurality of interaction coefficients, each interaction coefficient corresponding to particular constraint, and at least one goal;

a constraint checker module operable to access the memory, the constraint checker module operable to determine whether the network plan violates any of the constraints; and a resolver module operable to communicate with the constraint checker module, the resolver module operable to initialize said intereaction coefficients for each solution to said problem, and to provide said solution by iteratively repeating the following steps: to update an interaction coefficient corresponding to each violated constraint, said coefficient reflecting an impact upon the at least one goal caused by the resolution of a violation, to select a constraint violation to be resolved on the basis of said interaction coefficient, to generate a new plan in accordance with resolution of a selected constraint violation;

a network plan memory operable to provide data representing a display pertaining to said solution.

10. The system of claim 9, further comprising a solver module operable to communicate with the constraint checker module, the solver module operable to invoke the resolver module if it is determined that the network plan violates any of the constraints.

11. The system of claim 9, wherein the constraints are separated into at least one grouping, the constraint checker module further operable to update the corresponding interaction coefficients for each constraint within the grouping in order to reflect an impact upon the network plan caused by the resolution of a violation of one constraint in the grouping.

12. The system of claim 11, wherein the network plan is provided for a network comprising a plurality of interacting elements, and wherein the constraints are grouped according to association with a particular element of the network.

13. The system of claim 11, wherein the constraints are grouped according to association with a particular type of problem.

14. The system of claim 11, wherein each constraint has a corresponding size, and wherein the constraints are grouped according to size.

15. A computer-implemented method for solving a network planning problem, the method comprising the steps of:

receiving information specifying a network plan, a plurality of constraints, and a plurality of interaction coefficients, each interaction coefficient corresponding to particular constraint and at least one goal;

determining whether the network plan violates any of the constraints;

if one or more constraints is violated, to initialize said interaction coefficients for each solution to said problem, and to provide said solution by iteratively repeating the following steps: updating an interaction coefficient corresponding to each violated constraint, said coefficient reflecting an impact upon the at least one goal caused by the resolution of a violation, selecting a constraint violation to be resolved on the basis of said interaction coefficient, and generating a new plan in accordance with resolution of a selected constraint violation; and providing data representing a display pertaining to said solution.

16. The method of claim 15, further comprising the step of modifying the network plan using the updated interaction coefficient.

17. The method of claim 15, wherein the constraints are separated into at least one grouping, and further comprising the step of updating the corresponding interaction coefficients for each constraint within the grouping in order to reflect an impact upon the network plan caused by the resolution of a violation of one constraint in the grouping.

18. The method of claim 17, wherein the network plan is provided for a network comprising a plurality of interacting elements, and wherein the constraints are grouped according to association with a particular element of the network.

19. The method of Claim 17, wherein the constraints are grouped according to association with a particular type of problem.

20. The method of claim 17, wherein each constraint has a corresponding size, and wherein the constraints are grouped according to size.

* * * * *